May 19, 1964
W. JONES
3,133,393
ARTICLE TIMING AND TRANSFER MECHANISM FOR CARTONING MACHINES
Filed Sept. 5, 1961
6 Sheets-Sheet 3
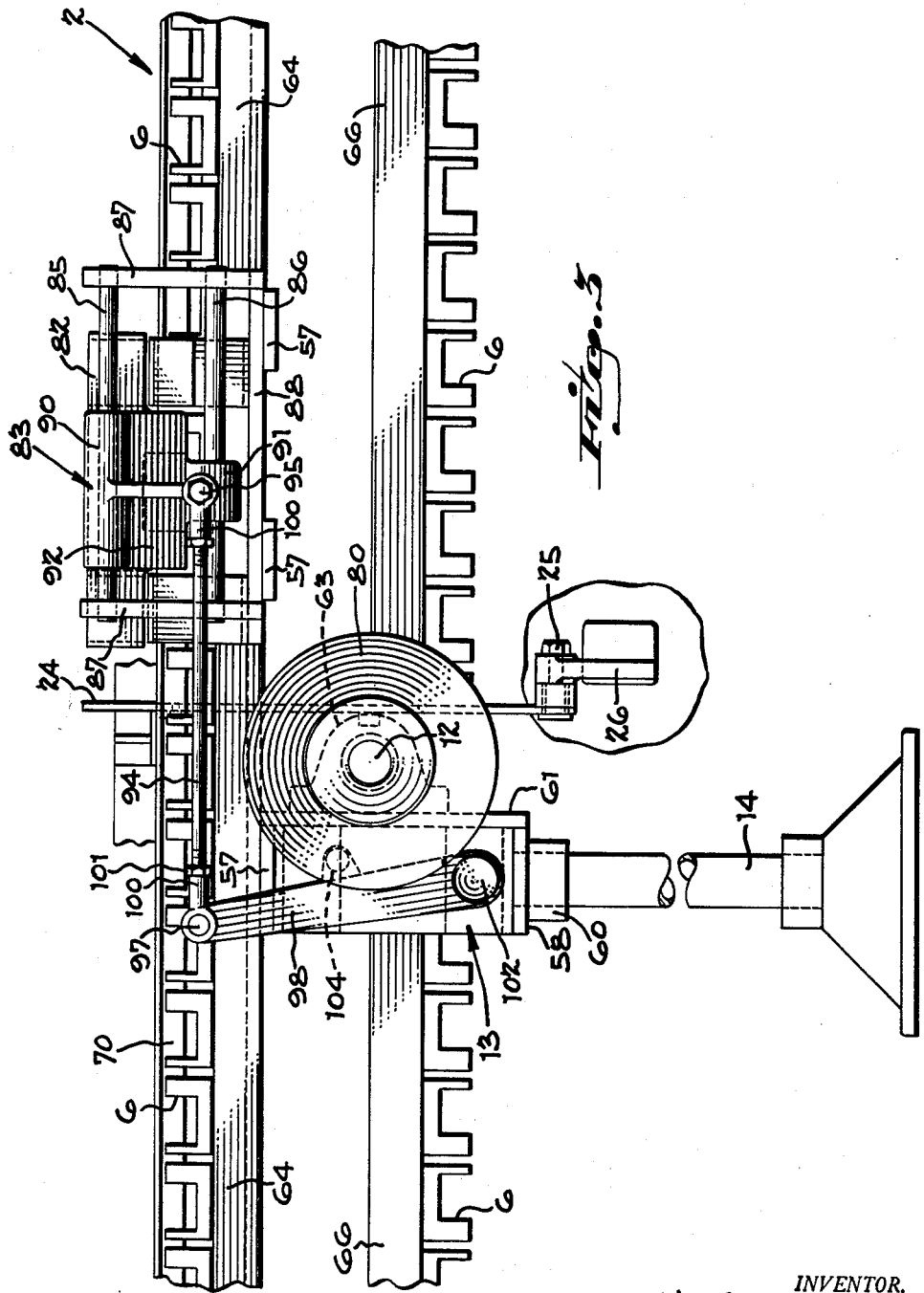
INVENTOR.
Wickliffe Jones.
BY
Wood, Herron & Evans.
ATTORNEYS.

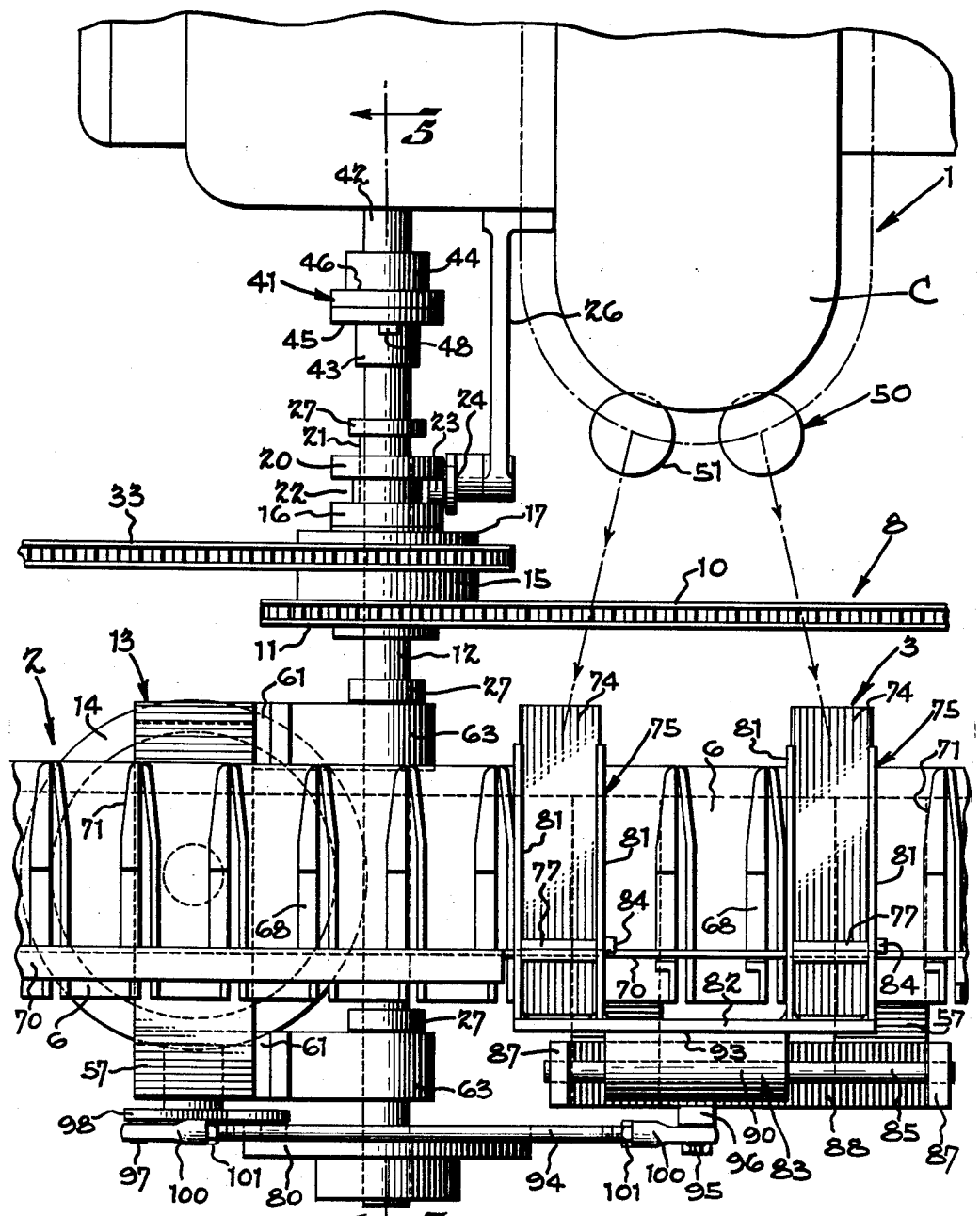

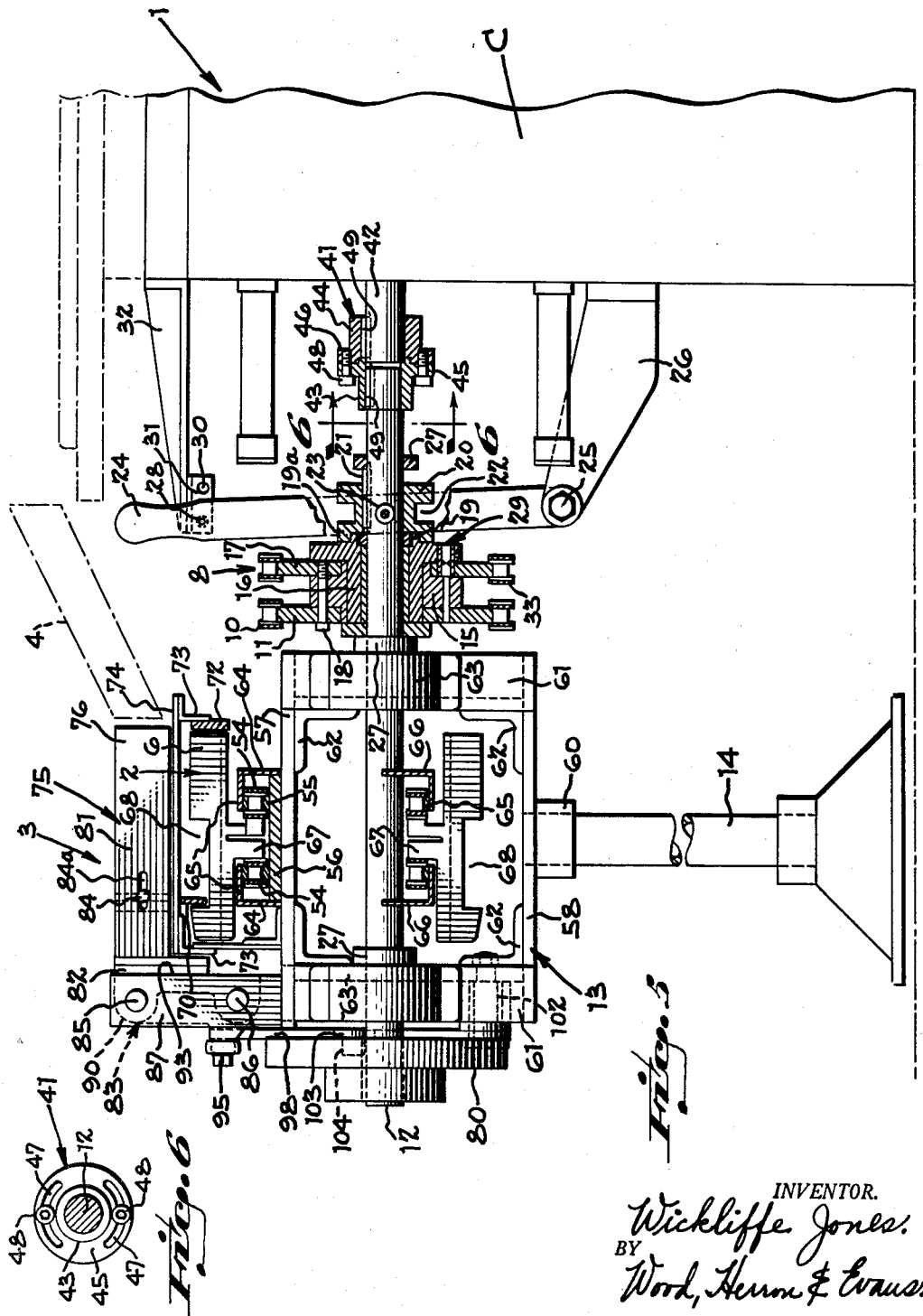

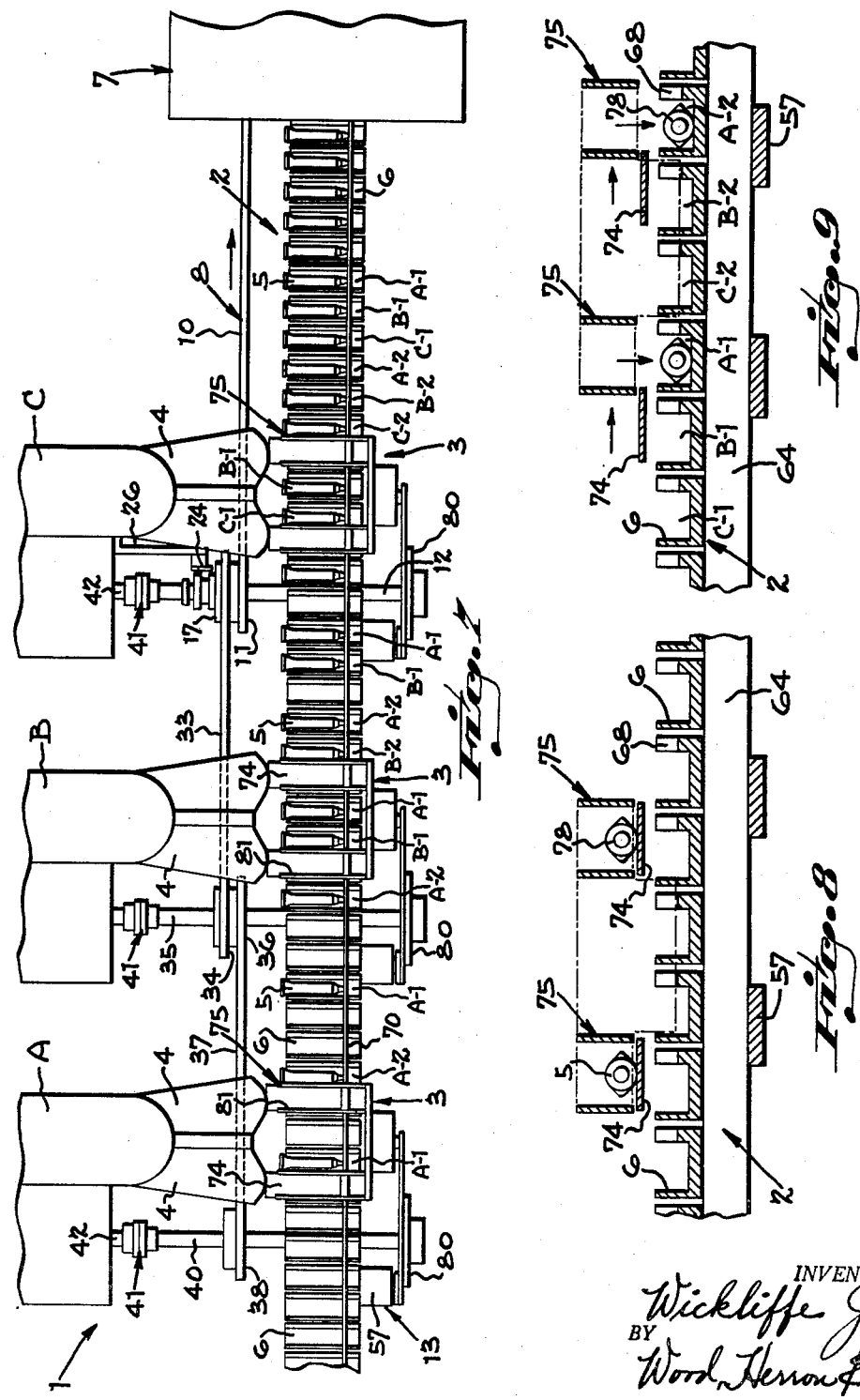

United States Patent Office 3,133,393
Patented May 19, 1964

3,133,393
ARTICLE TIMING AND TRANSFER MECHANISM
FOR CARTONING MACHINES
Wickliffe Jones, Cincinnati, Ohio, assignor to R. A. Jones and Company, Inc., Covington, Ky., a corporation of Kentucky
Filed Sept. 5, 1961, Ser. No. 136,087
14 Claims. (Cl. 53—251)

This invention relates generally to carton filling machinery and is directed particularly to a mechanism for transferring articles to a conveyor which, in turn, transports the articles to a carton loading machine, wherein the articles are inserted into individual cartons.

One of the primary objectives of the present invention has been to provide a transfer mechanism which is capable of transferring the articles from a tube filling or other processing machine to the buckets of an article conveyor in time with the continuous advancement of the buckets, whereby the transfer mechanism acts as a timing apparatus to load the successive conveyor buckets in a rapid and reliable manner.

In general, the transfer mechanism of the present invention is intended to coact with a processing machine, such as a tube filling machine, bottle filling machine or the like. The invention is disclosed in relation to a tube filling machine of conventional design, which loads paste or other plastic or flowable material into collapsible dispenser tubes, applies a cap to each filled tube, and finally discharges the sealed tubes by way of a pair of gravity chutes. In order to feed the tubes to the article conveyor buckets in time with the continuous advancement of the buckets, the tubes are transferred from the delivery chutes by the transfer mechanism of this invention.

Described generally, the transfer mechanism of the present invention includes a pair of feeders mounted for reciprocation adjacent the delivery chutes of the tube filling machine to receive the filled tubes. During one portion of the transfer cycle, the feeders dwell in a stationary receiving position adjacent the ends of the delivery chutes and receive a pair of filled tubes as they are discharged by gravity from the chute. Thereafter, the feeders reciprocate in the same direction as the advancing article conveyor buckets and in time therewith, thereby to transfer the tubes by gravity into selected conveyor buckets. The transfer mechanism thus is interposed between the filling machine and article conveyor to coordinate the feeding of the tubes accurately with respect to the advancement of the conveyor buckets.

After having been transferred to the buckets, the article conveyor transports the filled tubes to the carton loading machine where the tubes advance in endwise registry with the open ends of the cartons, which are erected and transported by a carton conveyor extending parallel with the article conveyor. The tubes are then shifted endwisely into the open ends of the cartons, the carton flaps are closed or sealed, then the completed package is discharged from the cartoning machine.

The modern carton loading machine is capable of erecting the cartons, feeding the articles into the cartons, and of closing or sealing the flaps in a very rapid and efficient manner. However, the conventional tube filling machine processes the tubes at a fraction of the speed at which the cartoning machine operates. In the present example, the carton loading machine, running at its normal speed, is capable of loading the cartons at a rate which is three times greater than the rate at which the filling machine fills the tubes, applies the caps and ejects the filled tubes from the machine.

A further objective therefore, has been to adapt the relatively slow, conventional tube filling machine for use with a high speed carton loading machine by providing a battery of the tube filling machines, combined with associated tube transfer mechanisms arranged to coordinate the slow cycles of the several filling machines with the rapid cycles of the carton loading machine. By virtue of this arrangement, each bucket of the conveyor is supplied with a filled tube as it advances toward the carton loading machine, thus providing sustained, high speed operation.

According to the example disclosed, wherein the tube filling machines operate at one-third the speed of the carton loading machine, three tube filling machines are located at spaced points along the article conveyor, which is in driving connection with the cartoning machine. The respective pairs of downwardly inclined delivery chutes of the filling machines are disposed above the article conveyor, and the respective tube transfer mechanisms are interposed between each pair of delivery chutes and the buckets of article conveyor. A common driving system interconnects the three filling machines and their associated tube transfer mechanisms with the carton loading machine, such that the filling machines and transfer mechanisms operate in time with one another and in time with the continuously advancing buckets of the article conveyor. As noted above, the feeders of each transfer mechanism receive the pair of filled tubes as they discharge from the chutes and reciprocate in time with the conveyor to transfer the articles into the buckets thereof.

In utilizing three tube filling machines according to the present example, the carton loading machine completes three cycles of operation for each cycle carried out by a given tube filling machine. Assuming that each cycle of operation of the carton loading machine represents 360 degrees of a circle then, in the present example, the cycles of the three filling machines are equally spaced at 120 degrees apart in relation to a given cycle of the carton loading machine. The arrangement is such that a total of six filled tubes, in groups of two each, are delivered from the three filling machines during each cycle of operation of the carton loading machine. The timing of the transfer mechanisms is such that the pairs of filled tubes are delivered to spaced pairs of buckets in predetermined order, starting at the upstream portion of the conveyor, such that each bucket of the conveyor receives one tube before reaching the carton loading machine.

A further objective of the invention has been to simplify the structure of the tube transfer mechanism and particularly the feeders which transfer the filled tubes from the filling machines to the conveyor buckets.

Described generally, the feeder of each transfer mechanism comprises a pair of stationary dead plates mounted in spaced relationship above the conveyor buckets in position to receive the tubes as they discharge by gravity from the chutes. An open generally U-shaped tube shifter or cradle is mounted above each dead plate, the pair of cradles being carried by a slidable carriage which is interconnected with a cam. The cam is adapted to maintain the carriage and U-shaped tube shifters in the above-noted stationary dwell period above the dead plates during one portion of the tube filling cycle. During this period the filled tubes advance across the dead plates and within the U-shaped cradle; thereafter, the cam reciprocates the cradles in time with the predetermined conveyor buckets, and in the same direction, so as to shift the tubes from the dead plates, causing them to drop by gravity into the buckets. Thereafter the pair of cradles are shifted back of the dead plates for the next tube filling cycle.

The various features and advantages of the invention will be more fully apparent to those skilled in the art from the following detailed description made with reference to the drawings.

In the drawings:

FIGURE 3 is a fragmentary front elevation, as viewed along the line 3—3 of FIGURE 1, further illustrating the bucket conveyor system and tube transfer mechanism.

FIGURE 4 is a top plan view, as projected from FIGURE 3, further illustrating the bucket conveyor and tube transfer mechanism.

FIGURE 5 is a sectional view taken along line 5—5 of FIGURE 4, further detailing the bucket conveyor and tube transfer mechanism.

FIGURE 6 is a sectional view taken along line 6—6 of FIGURE 5, detailing the adjustable coupling device which connects the tube filling station with the common driving system of the machine to provide synchronized operation of the components thereof.

FIGURE 7 is a fragmentary top plan view of the machine, showing the relationship of the tube filling machines and bucket conveyor.

FIGURE 8 is a fragmentary diagrammatic sectional view of the bucket conveyor and tube transfer mechanism, the transfer mechanism being shown in the receiving position corresponding to FIGURE 1.

FIGURE 9 is a fragmentary view similar to FIGURE 8, but showing the transfer mechanism shifted to its discharge position, corresponding to FIGURE 2, whereby the filled tubes are deposited in the buckets of the conveyor system for transport through the cartoning machine.

*General Arrangement*

Figure 1:
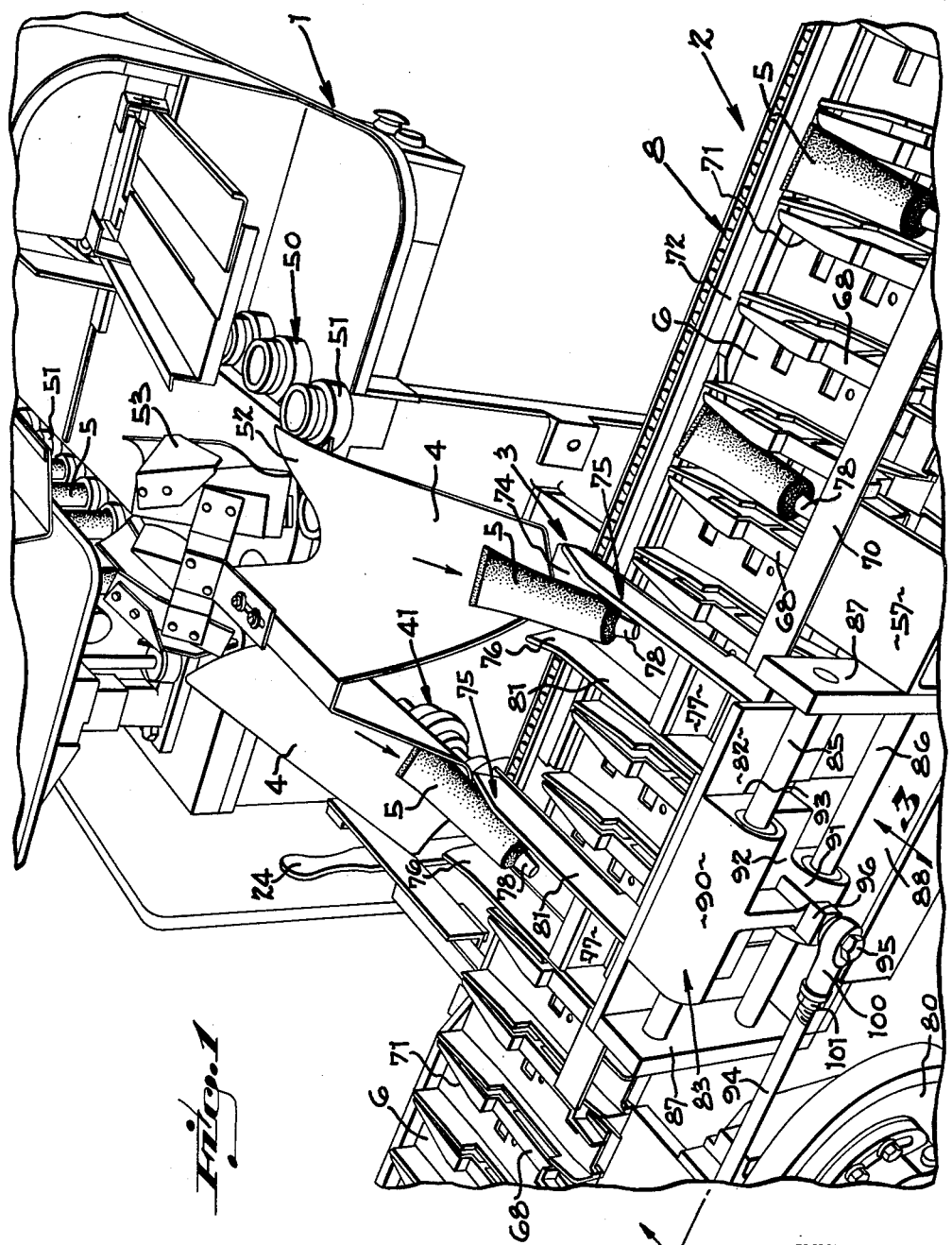
FIGURE 1 is a fragmentary perspective view showing one of the tube filling machines or stations in relation to the bucket conveyor of the carton loading machine, with the tube or article transfer mechanism in its tube receiving position.

Described with reference to FIGURES 1 and 2, the present mechanism generally comprises a series of conventional tube filling machines, in the present example, three in number, indicated generally at 1, an article or tube conveyor system 2, and a tube transfer mechanism 3 of the present invention interposed between each tube filling mechanism and article conveyor system. The tube filling machines 1 are conventional and, for this reason, have not been disclosed in detail. Briefly, each tube filling machine 1 is arranged to feed the flowable material, such as paste or the like into the tubes, apply a closure cap to the threaded outlet nipple of each filled tube, and finally, to discharge the filled tubes in pairs from the machine.

As shown in FIGURE 7, each filling machine is provided with two tube delivery chutes 4—4, mounted parallel with one another extending in a downwardly inclined plane from the filling machine 1 to the transfer mechanism 3. The filling machines 1 are mounted at equally spaced locations along the length of the conveyor system 2, such that the filled tubes 5 are delivered to the respective transfer mechanisms 3, which in turn, transfer the pairs of tubes to the buckets or receptacles 6 of the conveyor system.

The conveyor system advances continuously in the direction indicated by the arrow (FIGURE 7) toward the cartoning machine, which is indicated generally at 7, each bucket containing a tube 5 which is carried into the cartoning machine to be packaged. The cartoning machine of this type is well known in the art, being arranged to erect successive cartons from a collapsed condition, with the carton flaps folded to an open position, then to insert the filled tubes 5 endwisely into the open ends of the cartons, and finally to fold the carton flaps to a closed position for discharge of the packages from the machine.

A typical carton loading machine adapted to transfer the filled tubes from the buckets 6 of the conveyor system is disclosed in the prior Patent No. 2,285,283 which was assigned to R. A. Jones and Co., the assignee of the present application. In general, the prior patent discloses a bucket-type article conveyor corresponding to the present conveyor system 2, and a carton conveyor moving parallel with the article conveyor and arranged to advance the cartons in a path parallel to the articles, the cartons having open ends aligned with the advancing articles confined in the buckets of the article conveyor.

As the cartons and articles thus advance continuously in alignment with one another, the articles are transferred from the article conveyor buckets into the open ends of the cartons by a loading conveyor which is mounted above the article conveyor. The loading conveyor includes a chain run which advances along a path disposed at an oblique angle to the path of motion of the article conveyor and at the same rate of speed. This chain run includes downwardly depending pins or fingers which engage the articles, and due to the angular relationship of the loading conveyor and article conveyor, the fingers progressively advance the articles endwisely into the cartons. After the articles are inserted in the cartons, suitable flap-closing devices act to engage and close the flaps of the carton, after which the filled cartons are discharged from the machine. The carton loading machine indicated diagrammatically at 7 preferably follows the principles disclosed in this patent. The carton flaps may be either of the tucking type or of the adhesively sealed type, the carton loading machine having suitable mechanism to act upon either type of carton.

According to the present example, the carton loading machine 7 is driven by a suitable motor (not shown), the tube or article conveyor system 2 being in driving connection with the carton loading machine 7 so as to advance the tubes in timed relationship with the advancing cartons of the loading machine. The three tube filling machines, indicated at A, B and C (FIGURE 7), are also in driving connection with the carton loading machine 7 by way of a sprocket chain driving system, as explained in detail below. The sprocket chain system also drives the respective transfer mechanisms 3, which are associated with each of the three tube filling stations or machines.

In order to adjust the timing of the tube filling and transfer mechanisms with respect to the conveyor system 2, the driving chain system includes a manually operated clutch, as explained later, which upon being disengaged, permits the conveyor system 2 to advance relative to the three filling stations 1 and transfer stations 3, thus timing the transfer cycles with the advancement of the conveyor buckets 6. In addition, the operating cycles of the three tube filling machines may be regulated with respect to the conveyor system 2 and transfer mechanisms 3 by individual coupling devices which are interposed between the filling stations and sprocket chain driving system. This arrangement is also explained later.

It will be understood at this point that the conveyor system 2, transfer mechanisms 3, and carton filling machine 7 operate as a unit at a rate which is substantially greater than the rate of operation of the individual tube filling machines 1. In the present example, as noted earlier, the tube filling machines 1 each are capable of producing the filled tubes 5 at a rate which is one-third the production rate of the cartoning machine 7. The three tube filling machines 1 are arranged to operate in synchronism with the transfer mechanisms 3, the article conveyor 2 and the carton filling mechanism 7. The timing is such that the carton loading machine executes three cycles of operation for each cycle carried out by the respective tube filling and closing machines. Otherwise expressed, assuming that each cycle of operation of the carton loading machine represents 360 degrees of a circle, then the cycles of operation of the three tube filling machines 1 are related at 120 degrees apart with respect to the operating cycle. Since each tube filling machine delivers two filled tubes upon each cycle of operation, six tubes are delivered to the article conveyor and carton loading machine during each complete cycle of operation.

As best shown in FIGURE 7, the first upstream tube filling machine A, advances the first two tubes 5 to its associated transfer mechanism 3. The path of travel of the filled tubes relative to the transfer mechanism 3 at any given station is indicated by the arrows in FIGURE 4. These tubes are transferred to the conveyor buckets or pockets which are indicated at A–1 and A–2 (FIGURES 7 and 9). It will be noted that the buckets A–1 and A–2 represent every fourth bucket of the conveyor system, thus leaving two intervening buckets to be filled during the next successive cycles of operation. The second tube filling machine indicated at B, is related at 120 degrees downstream from machine A and is adapted, in cooperation with its related transfer mechanism 3, to deliver its successive pairs of filled tubes to the conveyor buckets adjacent the buckets A–1 and A–2, as indicated at B–1 and B–2. The third tube filling machine or station C, which is located downstream from station B, is arranged to transfer its pairs of filled tubes to the remaining buckets, as indicated at C–1 and C–2, which are adjacent the buckets B–1 and B–2, whereby each bucket is supplied with a filled tube as it advanced into the carton loading machine 7.

Tube Filling Machines

As explained above, the tube filling machines or stations 1 are conventional products, and for this reason, have not been disclosed in detail. The several filling machines 1, and the transfer mechanisms 3 are driven in synchronism with the cartoning machine 7 by means of a sprocket driving system, which is indicated generally at 8 in FIGURE 7. The carton loading machine 7 is powered by a suitable motor (not shown) and the tube conveyor system 2 is in driving connection with the carton loading machine 7, as noted earlier. The sprocket system 8 drives the tube filling machines 1 and the transfer mechanisms 3 in synchronism with one another and in synchronism with the carton loading mechanism.

As best shown in FIGURES 4, 5 and 7, the sprocket system 8 comprises a first chain run 10 extending from the carton loading machine 7 and passing about a driving sprocket 11 which is coupled to a driven shaft 12. The driven shaft 12 powers the downstream tube filling station C and its transfer mechanism 3. Shaft 12 is journalled on a frame structure 13, which supports the tube or article conveyor system 2. The frame structure 13 is supported relative to the floor by a series of standards 14 (FIGURE 5).

The driven sprocket 11 (FIGURE 5) is mounted on a hub 15 which, in turn, is rotatably journalled on a clutch sleeve 16. A companion sprocket 17 is mounted on the hub 15, two sprockets being secured to the hub by screws 18 which pass through the sprockets and hub, such that the two sprockets are rotatable as a unit with respect to the clutch sleeve 16. The clutch sleeve 16 includes a clutch element 19 which is engaged by a mating clutch element 19a forming a part of a shiftable clutch collar 20. The collar 20 is slidably keyed to the cross shaft 12 as at 21 and provides a driving connection from clutch sleeve 16 to shaft 12 when in the engaged position shown in FIGURE 5. An overload element 29 connects the hub 15 to the clutch sleeve 16.

The clutch collar 20 includes a peripheral groove 22 which is engaged by a roller 23 (FIGURE 5) journalled on a manually operated clutch control lever 24. Lever 24 is pivotally connected as at 25 to a bracket 26 projecting from the tube filling station, previously indicated at C. The shaft 12 is provided with a series of collars 27 which confine the several components axially with respect to the shaft 12.

In order to latch the control lever 24 in clutch engaging and disengaging positions, the clutch lever 24 is provided with a detent element 28 (FIGURE 5) engageable with recesses 30—30 formed in a detent plate 31. The detent plate is mounted upon a detent bracket 32 extending outwardly from the tube filling machine. The lever is shown in its clutch engaging position in FIGURE 5.

The shiftable clutch collar 20 and control lever 24 adapt the sprockets 11 and 17 to be disengaged with respect to the cross shaft 12 which drives the tube filling machine C and its article transfer mechanism 3. This permits the tube filling machine and the article transfer mechanism to be properly timed with respect to the advancement of the buckets 6 of the article conveyor system 2, bearing in mind that the article conveyor system is advanced by the carton loading machine 6 and in time therewith.

Again referring to FIGURE 7, it will be observed that the companion sprocket 17 of the first cross shaft 12 includes a second sprocket chain 33 passing around a sprocket 34 which is coupled to a second cross shaft 35. The second cross shaft 35 drives the upstream tube filling station B, and drives its associated transfer mechanism 3, similar to the cross shaft 12. The sprocket 35 includes a companion sprocket 36 meshing with a third chain run 37. Chain run 37 passes around a sprocket 38 coupled to a third cross shaft 40 which drives the tube filling station A.

The tube filling stations A and B are also equipped with respective shiftable clutch collars 20 and actuating levers 24, as described with reference to station C (FIGURE 5). This arrangement permits the tube filling machines A and B to be timed individually with respect to the article conveyor system 2 in the same manner. The clutch control arrangement is utilized primarily in setting up the machine for a given run of articles and also to assure that the filling machines are operating properly before the production run is initiated. Since the clutches and control levers are identical for the three filling stations, the structure has been omitted from stations A and B, which are shown diagrammatically in FIGURE 7.

In order to permit the three tube filling machines or stations to be synchronized precisely with their respective transfer mechanisms 3, each of the cross shafts 12, 35 and 40 is provided with an adjustable coupler, indicated generally at 41 (FIGURES 4 and 5), providing a driving connection with the respective drive shafts 42 of the three tube filling machines. Each coupler 41 comprises a pair of collars 43 and 44 having mating circular flanges 45 and 46. The collars 43 and 44 are keyed as at 49 to the axially aligned shafts. Each flange 45 (FIGURE 6) includes a pair of arcuate slots 47 traversed by screws 48 passing through the slots and threaded into mating flange 46. By virtue of this arrangement, the screws 48 may be loosened, permitting the selected shaft 42 to be rotated, thereby to synchronize the individual tube filling machines with respect to their transfer mechanisms 3.

From the foregoing, it will be understood that the article conveyor system 2 advances continuously in time with the operating cycles of the carton loading machine 7 to which it is connected. In setting up the machine, the operation of the three tube transfer mechanisms 3 may be controlled by manual operation of the three clutch control levers 24. The cycles of the tube filling machines A, B and C are properly synchronized with the other components of the mechanism by adjustment of the individual couplers 41 (FIGURE 6) which are provided for each filling station or machine.

In general, the three filling machines A, B and C are duplicates of one another, and each includes a tube conveyor 50 (FIGURES 1, 2 and 4), having a series of cylindrical receptacles 51, which are arranged to convey the tubes 5 in an upright position with respect to the mechanism which forces the flowable paste or other material into the respective tubes. The receptacles subsequently advance the filled tubes relative to the mechanism which applies the caps to the filled tubes.

As shown in FIGURE 1, the delivery chutes 4—4 have their upper ends 52 disposed adjacent the return sprocket (not shown) of the tube conveyor 50, such that the filled tubes may be delivered alternately to the downwardly inclined chutes 4—4. For this purpose, the tube conveyor 50 includes a suitable ejecting mechanism (not shown) which ejects the filled tubes 5 upwardly from the receptacles 51 to the receiving ends 52 of the chutes 4—4. The chutes include guide structures 53—53 which direct the ejected tubes into the upper ends 52 of the chutes. Upon being delivered to the chutes 4—4, the filled tubes slide by gravity down the chutes and into the transfer mechanism 3, as indicated by the arrows in FIGURE 1. After advancing into the transfer mechanism, the tubes 5 are transferred to the buckets 6 of the conveyor system 2, as explained below.

*Article Conveyor System*

As best shown in FIGURE 5, the article or tube conveyor system 2 comprises a pair of endless sprocket chains 54—54 which, as noted earlier, are in driving connection with the carton loading machine 7, the loading machine being provided with a pair of driving sprockets (not shown) about which the chain runs are trained. The upper run of the conveyor advances in the direction indicated by the arrow (FIGURE 2). The upstream end of the chain runs 54 pass about a pair of idler sprockets (not shown) which are journalled for rotation with respect to the conveyor frame 13. The upper or active runs of the chains 54 are slidably supported upon rails 55 (FIGURE 5) which are mounted in parallel relationship upon a longitudinal support plate 56. Plate 56 is mounted upon a series of cross pieces 57, which form a part of the conveyor frame 13.

The conveyor frame 13 is supported with respect to the standards 14 by respective lower cross pieces 58 (FIGURE 5) similar to the upper cross pieces 57, each cross piece 58 including a collar 60 attached to the upper end of the respective standards 14. The cross pieces 57 and 58 are mounted in spaced relationship one above the other by means of vertical members 61. The vertical members 61 are joined to the cross pieces by means of channel iron pieces 62. As shown in FIGURES 4 and 5 the cross shafts 12, 35 and 40 are journalled with respect to the frame 13 within bearing blocks 63—63, which are mounted upon the vertical members 61 at opposite sides of the frame 13.

In order to hold the upper chain runs downwardly with respect to the frame 13, there is provided a pair of confining rails which slidably engage the upper surface of the chain runs. As shown in FIGURE 5, each confining rail comprises an angle iron 64 rising from the longitudinal support rail 56 at opposite sides and having a horizontal limb overhanging the upper chain run. Each horizontal limb includes a track 65 which loosely embraces the rollers of the chain runs to confine the same. The lower or return runs of chains 54—54 are supported by similar angle irons 66 (FIGURE 5) having tracks 65 which engage and slidably support the lower chain runs and the buckets 6 thereof.

The buckets 6 are generally channel-shaped in cross section each bucket having lugs 67 projecting from the bottom thereof and interconnected with the chain runs 54—54 (FIGURE 5). The side walls of each bucket 6 are notched out as at 68 to accommodate a stationary rail 70 which acts as a stop to regulate the axial position of the tubes 5 with respect to the buckets 6. As viewed in FIGURE 1, the side walls of the buckets on the end opposite the rail 70 are flared outwardly as at 71 to conform with the flattened end portion of the tubes 5.

A second rail 72 (FIGURES 1 and 5) extends along the ends of the buckets opposite the rail 70 downstream from the transfer mechanisms 3. The rails 70 and 72 are supported by angle irons 73—73 extending above the buckets 6, the angle irons 73 being supported by the frame 13. The rails 70 and 72 are generally co-extensive with the conveyor 2 in the downstream direction and terminate within the carton loading mechanism 7 to permit the tubes to be transferred endwisely into their cartons.

*Transfer Mechanism*

As noted earlier, the tube filling machines A, B and C each include an individual tube transfer mechanism 3 (FIGURE 7) arranged to receive the pairs of filled tubes as they issue from the filling machines and to transfer the tubes to the continuously advancing buckets 6 of the conveyor. The three transfer machines are identical; therefore, the following description of one of the mechanisms applies to all three of them.

Figure 2:
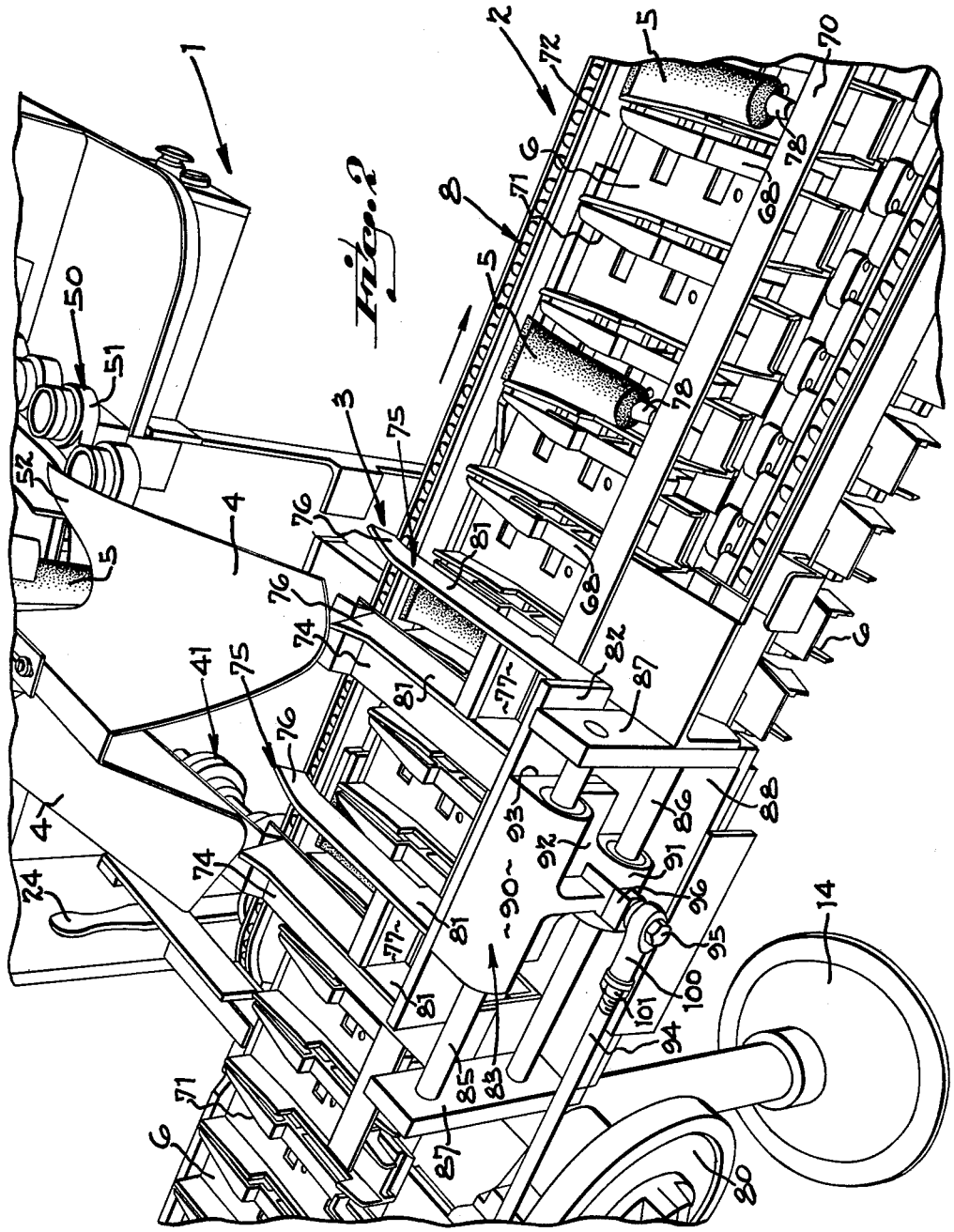
FIGURE 2 is a fragmentary perspective view similar to FIGURE 1, showing the tube transfer mechanism shifted to its discharge position, whereby the filled tubes are delivered to the advancing buckets of the conveyor system.

Referring to FIGURES 1, 2 and 5, the tube handling device or feeder of each transfer mechanism includes a pair of stationary dead plates 74—74 which are mounted upon the angle irons 73 above the buckets 6 of the conveyor in a horizontal position to receive the filled tubes 5 as they slide by gravity down the inclined delivery chutes 4—4 of the tube filling machines. The dead plates are disposed beneath the lower ends of the chutes 4 and extend outwardly therefrom. The angle of inclination of the chutes is sufficient to cause the filled tubes to slide down the chute at a speed which carries the tube longitudinally along the dead plate until it encounters a stop, as explained later. The stop locates the tube in a lengthwise position which enables it to be dropped by the transfer mechanism between the rails 70 and 72, which extend along opposite ends of the buckets 6, as noted earlier.

As shown diagrammatically in FIGURE 9, the dead plates 74 are spaced apart a distance equal to the center-to-center dimension of four of the conveyor buckets 6, such that the two filled tubes 5 subsequently may be transferred to the first and fourth buckets at the upstream station A. These two buckets have been previously indicated at A–1 and A–2. The two buckets intervening upstream from the buckets A–1 and A–2 subsequently are loaded at the downstream stations B and C, as noted earlier. It will be understood that the pairs of dead plates 74—74 at stations A, B and C occupy the same spacing with respect to the conveyor buckets and that they are located at equal spacing relative to one another along the conveyor run, as indicated in FIGURE 7.

As noted earlier, in the present example, the pair of tubes at station B are deposited in the buckets B–1 and B–2, adjacent the buckets A–1 and A–2. The tubes at station C subsequently are transferred to the buckets C–1 and C–2 upstream from the filled buckets B–1 and B–2, thus completing the transfer operations. It will be understood however, that this order of transfer cycles can be revised by relocating the pairs of dead plates relative to the conveyor run and by making appropriate changes in the timing of the components. In the present disclosure, the three transfer mechanisms are reciprocated in unison with one another and in properly timed relationship with the advancement of the conveyor buckets 6.

As shown in FIGURES 1 and 2, each pair of dead plates 74—74 includes corresponding U-shaped tube shifters or cradles, indicated generally at 75—75, which reciprocate in a horizontal plane so as to transfer the filled tubes 5—5 from the dead plates to the appropriate buckets 6 of the conveyor. Thus, in FIGURE 1 the cradles are shown in the tube-receiving dwell position in endwise alignment with the delivery chutes 4, so as to straddle the tubes and guide them longitudinally along the dead plates. To facilitate entry of the tubes, the open or receiving end of each cradle is flared outwardly as at 76. The opposite end portion of each cradle includes a block 77 adapted to engage the leading end or cap 78 of the filled tube so as to arrest the tube and thereby position it lengthwise within the cradle and along the dead plate, as noted earlier.

The cradles 75 dwell in the position shown in FIGURE 1 during the loading cycle, bearing in mind that the tube filling machine 1 operates in time with the conveyor and transfer mechanism, as explained earlier. At the end of the dwell period, the cradles are shifted horizontally to the position shown in FIGURE 2, thus shifting the tubes from dead plates and allowing them to drop by gravity into the buckets 6. The cradles are reciprocated in time with the advancing conveyor buckets by a cam, indicated generally at 80 in FIGURE 5 as described later.

Each cradle 75 comprises a pair of spaced plates 81—81 (FIGURES 3, 4 and 5), projecting in cantilever fashion from a mounting plate 82 secured to a reciprocating carriage or crosshead, indicated generally at 83, which is reciprocated by the cam 80. The stop block, previously indicated at 77, interfits the spaced plates 81 and is secured in place by screws 84 (FIGURE 5) passing through slots 84a formed in the plates 81 at opposite sides. The surface of the stop block which intercepts the end of the filled tube may be provided with a paid formed of resilient material to cushion the advancing tube when it is arrested. The slotted arrangement permits the block 77 to be adjusted along the cradle 75 so as to compensate for the length of the tubes or other articles which are handled by the mechanism.

As best shown in FIGURES 3 and 4, the carriage 83 is slidably mounted for reciprocation upon parallel slide rods 85 and 86, the opposite ends of the rods being secured to a pair of stationary mounting plates 87—87. The plates 87 rise from a horizontal base plate 88 which is attached to the cross pieces, previously indicated at 57, which form a part of the conveyor frame 13.

The crosshead or carriage 83 preferably comprises a one-piece unit having an upper boss 90 and a lower boss 91 (FIGURE 3) slidably journalled on the rods 85 and 86. The upper and lower bosses are joined together by a web 92. The web 92 presents a flat surface 93 (FIGURES 2 and 5) for attaching the mounting plate 82 of the cradles to the crosshead. The bearing bosses 90 and 91 preferably are provided with anti-friction bearings (not shown) which embrace the slide rods 85 and 86.

As best shown in FIGURES 2 and 3, the carriage 83 is in driving connection with the cam 80 by a link 94 which has one end connected to the crosshead by a pivot bolt 95. The pivot bolt 95 is threaded into a block 96 which is attached to the lower boss 91 of the carriage. The opposite end of the link is connected by a second pivot bolt 97 to a lever 98, which includes a cam roller, as explained later. In order to provide adjustment of the cradles 75 with reference to the conveyor buckets, the opposite ends of the link 94 include clevis connectors 100—100 which are threaded upon the end portions of the link and locked in adjusted position by lock nuts 101—101. The lock nuts are also threaded on the end portions of the link 94 in clamping engagement with the clevis connectors to lock them in adjustment.

The lower portion of the lever 98 is pivotally connected, as at 102 (FIGURE 3) to the vertical member 61 which forms a part of the conveyor frame 13, as explained earlier. At an intermediate point along the length of lever 98, there is provided a lug 103 upon which is journalled a cam roller 104. The roller is confined in a track (not shown) formed in the face of the cam 80. The cam is keyed to the driven shaft 12 which is in driving connection with the carton loading machine by way of the sprocket chain system 8, as described earlier. The track of the cam 80 is configurated to reciprocate the cradles 75—75 and to provide the dwell period during the loading cycle (FIGURE 8). At the end of the dwell period, the cam shifts the cradles in time with the designated conveyor buckets to the position of FIGURE 9 to transfer the filled tubes thereto; thereafter the cradles return to the receiving position for the next tube filling and transfer cycle.

Having described my invention, I claim:

1. A transfer mechanism for transferring articles from a processing machine to a continuously advancing conveyor in time with the advancement of the conveyor, said processing machine having delivery means adapted to advance the articles toward the conveyor along a path generally at right angles to the path of motion of said conveyor, said transfer mechanism comprising, a stationary article receiving element mounted above said conveyor in a position to receive the articles delivered from the processing machine along said generally right angular path, an article shifting element, stationary guide means mounted relative to said conveyor in parallelism therewith and adapted to support said article shifting element for reciprocation in a generally horizontal plane and parallel to the path of conveyor advancement relative to the article receiving element, and actuating means connected to said article shifting element, said actuating means adapted to provide a dwell period during which the article shifting element remains in a stationary position above the receiving element to embrace an article delivered from the processing machine, said actuating means thereafter adapted to reciprocate the article shifting element in time with the advancement of said conveyor and in the same direction, whereby the article resting upon said article receiving element is shifted therefrom and adapted to drop by gravity to said conveyor in time with the advancement thereof.

2. A transfer mechanism for transferring articles from a processing machine to a conveyor, said processing machine having a delivery chute adapted to advance the articles toward the conveyor along a path generally at right angles to the path of motion of said conveyor, said transfer mechanism comprising, a stationary dead plate mounted above said conveyor in a position to receive articles delivered from said processing machine along said generally right angular path, a generally U-shaped article shifting element mounted for reciprocation in a horizontal path relative to said dead plate and parallel to the path of conveyor advancement, said U-shaped article shifting element having an open end presented to the processing machine adapted to receive the articles advancing along said right angular path from the processing machine, and actuating means connected to the article shifting element and adapted to reciprocate the same in time with the advancement of the said conveyor buckets, said actuating means moving the said article shifting element at substantially the same rate as the rate of conveyor advancement and in the same direction, whereby an article resting upon said dead plate is shifted therefrom by the article shifting element and adapted to drop by gravity therefrom into a predetermined bucket of said conveyor.

3. A transfer mechanism for transferring articles from a processing machine to the buckets of a continuously advancing conveyor in time with the advancement of said buckets, said processing machine having delivery means adapted to advance the articles toward the conveyor along a path generally at right angles to the path of motion of the conveyor, said transfer mechanism comprising, a stationary dead plate mounted above said conveyor in a position to receive articles delivered from said processing machine, a generally U-shaped article shifting element, stationary guide means mounted relative to said conveyor and extending parallel to the path of motion of the conveyor, said guide means adapted to support said article shifting element for reciprocation in a horizontal path relative to said dead plate and parallel to the path of conveyor advancement, said U-shaped article shifting element comprising a pair of spaced limbs adapted to receive and straddle an article which is delivered along said right angular path from the processing machine and to guide the article to a predetermined position along said dead plate, and actuating means connected to the article shifting element and adapted to reciprocate the same in time with the continuous advancement of the said conveyor buckets, said actuating means shifting the article shifting element at substantially the same rate as the rate of conveyor advancement and in the same direction, whereby an article resting upon said dead plate is shifted therefrom by the article shifting element and adapted to drop by gravity therefrom into a predetermined bucket of said conveyor in time with the advancement thereof.

4. A transfer mechanism for transferring articles from a processing machine to the buckets of a continuously advancing conveyor in time with the advancement of said buckets, said processing machine having delivery means adapted to advance the articles toward the conveyor along a path generally at right angles to the path of advancement of said buckets, said transfer mechanism comprising, a stationary dead plate mounted above said conveyor in a position to receive articles delivered from said processing machine, a generally U-shaped article shifting element, stationary guide means mounted relative to said conveyor and extending parallel with the path of motion of the buckets of said conveyor, said stationary means adapted to support said U-shaped article shifting element for reciprocation in a horizontal path relative to said dead plate, said U-shaped article shifting element comprising a pair of spaced limbs adapted to straddle an article which is delivered along said generally right angular path from the processing machine and to guide the article transversely along the dead plate as the article is advanced from the processing machine, stop means carried by the article shifting element and adapted to arrest the article at a predetermined position along the dead plate, and actuating means connected to the article shifting element and adapted to reciprocate the same in a path parallel to the path of conveyor advancement and in time with the advancement of the said conveyor buckets, said actuating means shifting the article shifting element at substantially the same rate as the rate of conveyor advancement and in the same direction, whereby an article resting upon said dead plate is shifted therefrom by the article shifting element and adapted to drop by gravity therefrom into a predetermined bucket of said conveyor.

5. A mechanism for transferring articles from a processing machine to the buckets of a continuously advancing conveyor in time with the advancement of said buckets comprising, a stationary dead plate mounted above said conveyor in a position to receive articles delivered from said processing machine, stationary guide means mounted relative to said conveyor, a crosshead slidably mounted on said guide means for reciprocation in a generally horizontal path parallel to the path of advancement of the conveyor, a generally U-shaped article shifting element mounted on said crosshead for reciprocation in said generally horizontal path relative to said dead plate, said U-shaped article shifting element comprising a pair of spaced elements adapted to straddle an element which is delivered from the processing machine to said dead plate, and actuating means connected to the said crosshead and adapted to reciprocate the crosshead and article shifting element along a path parallel to the path of conveyor advancement, in the same direction, and in time with the advancement of the said conveyor buckets, whereby an article resting upon said dead plate is shifted therefrom by the article shifting element and adapted to drop by gravity into a predetermined bucket of said conveyor.

6. A transfer mechanism for transferring articles from a processing machine to the buckets of a continuously advancing article conveyor in time with the advancement of the conveyor buckets, said processing machine having delivery means adapted to advance the articles toward the conveyor along a path generally at right angles to the path of motion of the conveyor buckets, said transfer mechanism comprising, a pair of stationary article receiving elements mounted above said conveyor in spaced relationship to one another along the conveyor in a position to receive pairs of articles which are delivered along said right angular path from said processing machine, a pair of article shifting elements, stationary guide means mounted relative to said article conveyor and extending generally in parallelism with the path of advancement of the conveyor buckets, said stationary guide means adapted to support said pair of article shifting elements for reciprocation in unison with one another in a generally horizontal plane relative to said pair of article receiving elements, and actuating means connected to said pair of article shifting elements adapted to reciprocate the same in time with the advancing buckets of said conveyor, said actuating means adapted to reciprocate said article shifting elements along a line parallel with the path of advancement of the article conveyor and in the same direction, whereby a pair of articles resting upon said article receiving elements is shifted from the article receiving elements and adapted to drop by gravity into a pair of advancing buckets of said conveyor.

7. A transfer mechanism for transferring articles from a processing machine to the buckets of a continuously advancing article conveyor in time with the advancement of the conveyor buckets, said processing machine having delivery means adapted to advance the articles toward the conveyor along a path generally at right angles to the path of motion of said conveyor buckets, said transfer mechanism comprising, a pair of stationary article receiving elements mounted above said conveyor in spaced relationship to one another along the path of advancement of the conveyor in a position to receive pairs of articles which are delivered along said generally right angular path from said processing machine, a pair of article shifting elements, stationary guide means mounted relative to said conveyor and extending in parallelism with the path of motion of the conveyor buckets, said guide means adapted to support said pair of article shifting elements for reciprocation in unison with one another in a generally horizontal plane relative to said pair of article receiving elements, and actuating means connected to said pair of article shifting elements adapted to reciprocate the same in time with one another, said actuating means adapted to provide a stationary dwell period wherein the article shifting elements remain in a stationary position above the article receiving elements, the processing machine being adapted to deliver a pair of articles to the article receiving elements in a position to be engaged by said article shifting elements, said actuating means adapted to reciprocate said article shifting elements relative to the article receiving elements at the end of said dwell period along a line parallel to the path of advancement of the conveyor, in the same direction and in time with the advancement of the conveyor buckets, whereby a pair of articles resting upon said article receiving elements is shifted from the article receiving elements and adapted to drop by gravity into a pair of advancing buckets of said conveyor.

8. A transfer mechanism for transferring articles from a processing machine to the buckets of a continuously advancing article conveyor in time with the advancement of the conveyor buckets, said processing machine having delivery means adapted to advance the articles toward the conveyor along a path generally at right angles to the path of motion of the conveyor buckets, said transfer mechanism comprising, a pair of stationary article receiving elements mounted above said conveyor in spaced relationship to one another along the path of advancement of the conveyor in a position to receive pairs of articles which are delivered along said generally right angular path from said processing machine, a pair of article shifting elements, stationary guide means mounted relative to the conveyor in parallelism with the path of motion thereof and adapted to support said pair of article shifting elements for reciprocation in unison with one another relative to said pair of article receiving elements. driving means connected in common to said processing machine, conveyor and pair of article shifting elements, said driving means adapted to actuate the processing machine, conveyor and article shifting elements in time with one another, said driving means adapted to provide a stationary dwell period wherein the article shifting elements remain in a stationary position above the article receiving elements, the processing machine being adapted to deliver a pair of articles to the article receiving elements in a position to be engaged by said article shifting elements, and said driving means adapted to reciprocate said article shifting elements relative to the article receiving elements at the end of said dwell period in the direction of advancement of the conveyor and in time therewith, whereby a pair of articles resting upon said article receiving elements is shifted from the article receiving elements and adapted to drop by gravity into a pair of advancing buckets of said conveyor.

9. A mechanism for transferring articles from a processing machine to the buckets of a continuously advancing article conveyor in time with the advancement of the conveyor buckets comprising, a pair of stationary article receiving elements mounted above said conveyor in spaced relation to one another along the path of advancement of the conveyor in a position to receive pairs of articles which are delivered from said processing machine, stationary guide means mounted in a stationary position relative to the conveyor, a crosshead slidably mounted on said guide means for reciprocation in a horizontal path parallel to the path of motion of the conveyor, a pair of article shifting elements mounted on said crosshead for reciprocation in unison with one another along said generally horizontal path relative to said pair of article receiving elements, common driving means connected to said processing machine, conveyor and crosshead, said driving means adapted to actuate the processing machine, conveyor and article shifting elements in time with one another, said driving means adapted to provide a stationary dwell period wherein the pair of article shifting elements remain in a stationary position above the article receiving elements, the processing machine being adapted to deliver a pair of articles to the article receiving elements in a position to be engaged by said article shifting elements, said driving system adapted to reciprocate said pair of article shifting elements relative to the article receiving elements at the end of said dwell period in the direction of advancement of the conveyor and in time therewith, whereby a pair of articles resting upon said article receiving elements is shifted from the article receiving elements and adapted to drop by gravity into the buckets of said conveyor.

10. A mechanism for processing articles and for transferring the processed articles individually to the buckets of a conveyor comprising, a plurality of processing machines mounted in spaced relationship to one another parallel with and along the path of advancement of said conveyor, said processing machines having delivery means adapted to advance articles toward the conveyor in a path generally at right angles to the path of advancement of the conveyor, a respective article transfer mechanism associated with each of said processing machines, each of said article transfer mechanisms having a stationary article receiving element mounted above said conveyor and adapted to receive an article delivered by the processing machine, an article shifting element mounted above each article receiving element, respective stationary guide means for each article shifting element, said stationary guide means mounted in parallel relationship to the conveyor and adapted to support said article shifting element for reciprocating motion in a generally horizontal path parallel with the path of advancement of the conveyor, and actuating means connected to the article shifting element of each transfer mechanism, said actuating means adapted to reciprocate the plurality of article shifting elements with the articles confined therein in said horizontal path in time with the advancement of the buckets of the conveyor and in the same direction, whereby the articles are shifted from said article receiving elements and are adapted to drop by gravity into the individual buckets of the conveyor.

11. A mechanism for processing articles and for transferring the processed articles to the individual buckets of a continuously advancing linear conveyor comprising, a plurality of processing machines mounted in spaced relationship relative to one another parallel with and along the path of advancement of said conveyor, said processing machines having delivery means adapted to advance the articles toward the conveyor in a path generally at right angles to the path of advancement of the conveyor, a respective article transfer mechanism associated with each of said processing machines, each of said article transfer mechanisms having a stationary article receiving element mounted above said conveyor and adapted to receive an article delivered by the processing machine, an article shifting element mounted above each article receiving element, respective stationary guide means for each article shifting element, said guide means mounted in parallel relationship to the path of advancement of the conveyor and adapted to support the article shifting element for reciprocating motion in a generally horizontal path parallel with the path of advancement of the conveyor, and actuating means connected to the article shifting element of each transfer mechanism, said actuating means adapted to maintain the article shifting elements in a stationary position above said article receiving elements during a dwell period, the processing machines adapted to deliver the articles to the receiving elements in a position to be engaged by the article shifting elements, said actuating means thereafter adapted to shift said article shifting elements with the article confined therein in said horizontal path from the article receiving elements in time with the advancement of the buckets of the conveyor and in the same direction, whereby the articles are shifted from said article receiving elements and are adapted to drop by gravity into the individual buckets of the continuously advancing conveyor.

12. A mechanism for processing articles and for transferring the processed articles to the spaced individual buckets of a continuously advancing linear conveyor comprising, a plurality of processing machines mounted in spaced relationship relative to one another parallel with and along the path of advancement of said conveyor, said processing machines having delivery means adapted to advance the articles toward the conveyor in a path generally at right angles to the path of advancement of the conveyor, a respective article transfer mechanism associated with each of said processing machines, each of said article transfer mechanisms having a stationary article receiving element mounted above said conveyor and adapted to receive an article delivered by the processing machine, an article shifting element mounted above said article receiving element, respective stationary guide means mounted relative to the conveyor in parallel relationship to the path of motion of the conveyor, said guide means supporting said article shifting element for reciprocating motion in a generally horizontal path parallel with the path of advancement of the conveyor, and actuating means connected to the article shifting element of each transfer mechanism, said actuating means adapted to reciprocate the article shifting elements with the article confined therein in said horizontal path in time with the advancement of the buckets of the conveyor and in the same direction, the spacing of the article receiving elements and reciprocation of the article shifting elements being related to the spaced individual buckets of the conveyor to transfer the articles into pre-selected spaced buckets, whereby an article is transferred to each successive bucket of the conveyor during passage of a given group of conveyor buckets relative to the plurality of transfer mechanisms.

13. A mechanism for processing articles and for transferring the processed articles to the spaced individual buckets of a continuously advancing linear conveyor comprising, a plurality of processing machines mounted in spaced relationship relative to one another parallel with and along the path of advancement of said conveyor, said processing machines, having delivery means adapted to advance the articles toward the conveyor in a path generally at right angles to the path of advancement of the conveyor, said processing machines adapted to deliver processed articles in pairs, a respective article transfer mechanism associated with each of said processing machines, each of said article transfer mechanisms having a pair of stationary article receiving elements mounted above the conveyor, a pair of article shifting elements mounted above said article receiving elements, respective stationary guide means for each pair of article shifting elements, said stationary guide means mounted in parallel relationship to the path of conveyor advancement and adapted to support the pair of article shifting elements for reciprocating motion in a generally horizontal path relative to said article receiving elements and in a path parallel to the path of conveyor advancement and actuating means adapted to maintain the respective pairs of article shifting elements in respective stationary dwell positions above said article receiving elements while the pairs of articles are delivered from the processing machines to the article receiving elements, said actuating means thereafter adapted to reciprocate the pairs of article shifting elements with the pairs of articles confined therein in said horizontal path in time with the advancement of the buckets of the conveyor and in the same direction, whereby said pairs of articles are shifted from said article receiving elements into the buckets of the continuously advancing conveyor, the location of said article receiving elements being related to the spacing of said conveyor buckets, adapting the articles to be transferred into preselected pairs of buckets, whereby an article is transferred to each bucket of the conveyor upon advancement of a given group of buckets relative to the plurality of transfer mechanisms.

14. A machine for processing articles and for loading the articles individually into cartons comprising, a continuously advancing carton loading machine having an article conveyor extending outwardly therefrom and driven in time therewith, spaced buckets on said conveyor adapted to convey the individual articles through the carton loading machine, a plurality of article processing machines mounted in spaced relationship to one another along said conveyor and parallel with the path of advancement of the conveyor, said processing machines having delivery means adapted to advance the articles toward the conveyor in a path generally at right angles to the path of advancement of the conveyor, and a respective article transfer mechanism interposed between each processing machine and the article conveyor, said article transfer mechanisms adapted to receive the processed articles which are delivered from the processing machines, each article transfer mechanism including an article shifting element, a respective stationary guide means for each article shifting element, said guide means mounted relative to the article conveyor in parallel relationship to the path of advancement of the conveyor, said stationary guide means supporting the article shifting element for reciprocating motion in a horizontal path parallel to the path of advancement of the article conveyor buckets and in time therewith, thereby to transfer the articles to the buckets of the conveyor in time with the advancement thereof, said carton loading machine adapted to load the articles into the cartons at a rate at least twice the rate at which the processed articles are delivered from an individual article processing machine, the number of processing machines along the conveyor providing a combined delivery of processed articles corresponding to the rate at which the carton loading machine loads the articles into the cartons, whereby an article is delivered to each bucket of the conveyor during advancement relative to the plurality of transfer mechanisms toward the carton loading machine.

References Cited in the file of this patent

UNITED STATES PATENTS

| | | |
|---|---|---|
| 1,935,269 | Jones | Nov. 14, 1933 |
| 2,907,159 | Allen | Oct. 6, 1959 |
| 2,935,827 | Burt | May 10, 1960 |
| 2,959,903 | Lancaster | Nov. 15, 1960 |